United States Patent
Felde

[11] Patent Number: 6,155,063
[45] Date of Patent: Dec. 5, 2000

[54] BEVERAGE TEMPERATURE CONTROL SYSTEM FOR A VEHICLE

[76] Inventor: Philip E. Felde, 1408 S. 14th St., Moorhead, Minn. 56560-3750

[21] Appl. No.: 09/363,755

[22] Filed: Jul. 29, 1999

[51] Int. Cl.[7] ....................................................... B60H 1/32
[52] U.S. Cl. .......................................... 62/244; 296/37.12
[58] Field of Search .......................... 62/244, 426, 457.9, 62/457.1; 296/37.12

[56] References Cited

U.S. PATENT DOCUMENTS

| | | | |
|---|---|---|---|
| 2,902,838 | 9/1959 | Nichols | 62/244 |
| 3,505,830 | 4/1970 | Koerner | 62/244 |
| 4,892,138 | 1/1990 | Bibik, Jr. | 62/244 |
| 5,050,399 | 9/1991 | Peahl | 62/244 |
| 5,092,395 | 3/1992 | Amidzich | 62/244 |
| 5,165,646 | 11/1992 | Gewecke | 62/244 |
| 5,203,833 | 4/1993 | Howell | 62/244 |

Primary Examiner—William E. Tapolcai
Attorney, Agent, or Firm—Michael S. Neustel

[57] ABSTRACT

A beverage temperature control system for a vehicle for maintaining a desirable temperature of a beverage within a container while traveling. The inventive device includes a container having a floor, at least one side wall and an upper opening, a plurality of support members attached to the floor for supporting a beverage can a finite distance above the floor, an air delivery tube connected within the container and fluidly connected to the vehicle's ventilation system, and a cover pivotally attached to container for allowing selective covering of the upper opening. The container is preferably permanently positioned within the surface member of a vehicle such as the side doors or dashboard. The user opens the cover and inserts the beverage can or bottle into the interior of the container. The cool air from the ventilation system enters the interior of the container about the beverage can thereby cooling and maintaining the desired temperature of the beverage can. In an alternative embodiment, the container does not have an upper opening, but rather a front side opening with a door pivotally attached about for allowing a beverage can to be inserted into the container from the side.

20 Claims, 4 Drawing Sheets

BEVERAGE TEMPERATURE CONTROL SYSTEM FOR A VEHICLE

BACKGROUND OF THE INVENTION

1. Field of the Invention

The present invention relates generally to beverage cooling/warming devices and more specifically it relates to a beverage temperature control system for a vehicle for maintaining a desirable temperature of a beverage within a container while traveling.

Many individuals while traveling within a vehicle will bring beverages along with them for consumption while traveling. To avoid having the beverages becoming warm, the user must bring a cooler filled with ice along to avoid the beverage becoming similar in temperature as the interior of the vehicle. This can be extremely messy and cumbersome to have a sizable cooler filled with ice that eventually melts within the confined area of a vehicle. If the beverage is originally warm, it is desirable to maintain the temperature within the beverage for allowing extended period of time for consumption. Hence, there is a need for a heating/cooling system within a vehicle for maintaining a desirable temperature within the beverage container over extended periods of time while traveling.

2. Description of the Prior Art

Beverage cooling and heating devices have been in use for years. Typically, a container known as a "cooler" is filled with ice for maintaining a desired temperature within and the beverages are then added to within the cooler where the beverages slowly assume the temperature of the ice and water that results there from. Coolers are useful for their designed purpose, however for use within a vehicle while traveling conventional coolers consume a significant amount of space within the interior of the vehicle.

Examples of attempted modifications to convention beverage cooling devices include U.S. Pat. No. 4,852,843 to Chandler; U.S. Pat. No. 342,192 to Yu; U.S. Pat. No. 5,697,587 to Israel; U.S. Pat. No. 373,935 to Cole et al.; U.S. Pat. No. 363,646 to Wong; U.S. Pat. No. 342,871 to Stern et al.; U.S. Pat. No. 342,869 to Fry; U.S. Pat. No. 338,138 to Miyajima; U.S. Pat. No. 305,966 to DeMars; U.S. Pat. No. 5,593,124 to Wang which are all illustrative of such prior art.

Chandler (U.S. Pat. No. 4,852,843) discloses a beverage holder for attachment to a vehicle heating and cooling vents. Chandler teaches a U-shaped jacket having a curved front portion, an open back portion, and a top opening for receiving a conventional beverage container. Chandler further teaches a pair of hooks for demountably securing the holder to the louvers of the air conditioning and heating unit of the automobile.

Yu (U.S. Pat. No. 342,192) discloses a design patent for a temperature sustaining cup holder for use in vehicles. Yu teaches a lower ring, an upper ring, a wire mesh between the rings forming a tubular structure, a floor, and a pair of hooks extending from the wire mesh for attaching to a vent of a vehicle.

Israel (U.S. Pat. No. 5,697,587) discloses a device for cooling drink bottles and cans within the vehicle. Israel teaches a holding device for positioning a beverage container adjacent an air conditioning outlet within the vehicle to obtain a cooling effect.

While these devices may be suitable for the particular purpose to which they address, they are not as suitable for maintaining a desirable temperature of a beverage within a container while traveling. Conventional cooling/heating devices are generally not suitable for use while traveling because of the amount of space they consume within the vehicle. In addition, previous attempts to solve this problem provide short-term remedies that are not suitable for long-term usage.

In these respects, the beverage temperature control system for a vehicle according to the present invention substantially departs from the conventional concepts and designs of the prior art, and in so doing provides an apparatus primarily developed for the purpose of maintaining a desirable temperature of a beverage within a container while traveling.

SUMMARY OF THE INVENTION

In view of the foregoing disadvantages inherent in the known types of beverage cooling/heating devices now present in the prior art, the present invention provides a new beverage temperature control system for a vehicle construction wherein the same can be utilized for maintaining a desirable temperature of a beverage within a container while traveling.

The general purpose of the present invention, which will be described subsequently in greater detail, is to provide a new beverage temperature control system for a vehicle that has many of the advantages of the beverage heating/cooling devices mentioned heretofore and many novel features that result in a new beverage temperature control system for a vehicle which is not anticipated, rendered obvious, suggested, or even implied by any of the prior art beverage heating/cooling devices, either alone or in any combination thereof.

To attain this, the present invention generally comprises a container having a floor, at least one side wall and an upper opening, a plurality of support members attached to the floor for supporting a beverage can a finite distance above the floor, an air delivery tube connected within the container and fluidly connected to the vehicle's ventilation system, and a cover pivotally attached to container for allowing selective covering of the upper opening. The container is preferably permanently positioned within the surface member of a vehicle such as the side doors or dashboard. The user opens the cover and inserts the beverage can or bottle into the interior of the container. The cool air from the ventilation system enters the interior of the container about the beverage can thereby cooling and maintaining the desired temperature of the beverage can. In an alternative embodiment, the container does not have an upper opening, but rather a front side opening with a door pivotally attached about for allowing a beverage can to be inserted into the container from the side.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a beverage temperature control system for a vehicle that will overcome the shortcomings of the prior art devices.

Another object is to provide a beverage temperature control system for a vehicle that is integral within the vehicle.

An additional object is to provide a beverage temperature control system for a vehicle that efficiently cools or heats a beverage container within the vehicle.

A further object is to provide a beverage temperature control system for a vehicle that maintains a desirable temperature within a beverage container.

Another object is to provide a beverage temperature control system for a vehicle that does not require attachment to a vent within the vehicle's ventilation system.

A further object is to provide a beverage temperature control system for a vehicle that is capable of receiving both beverage cans and beverage bottles.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
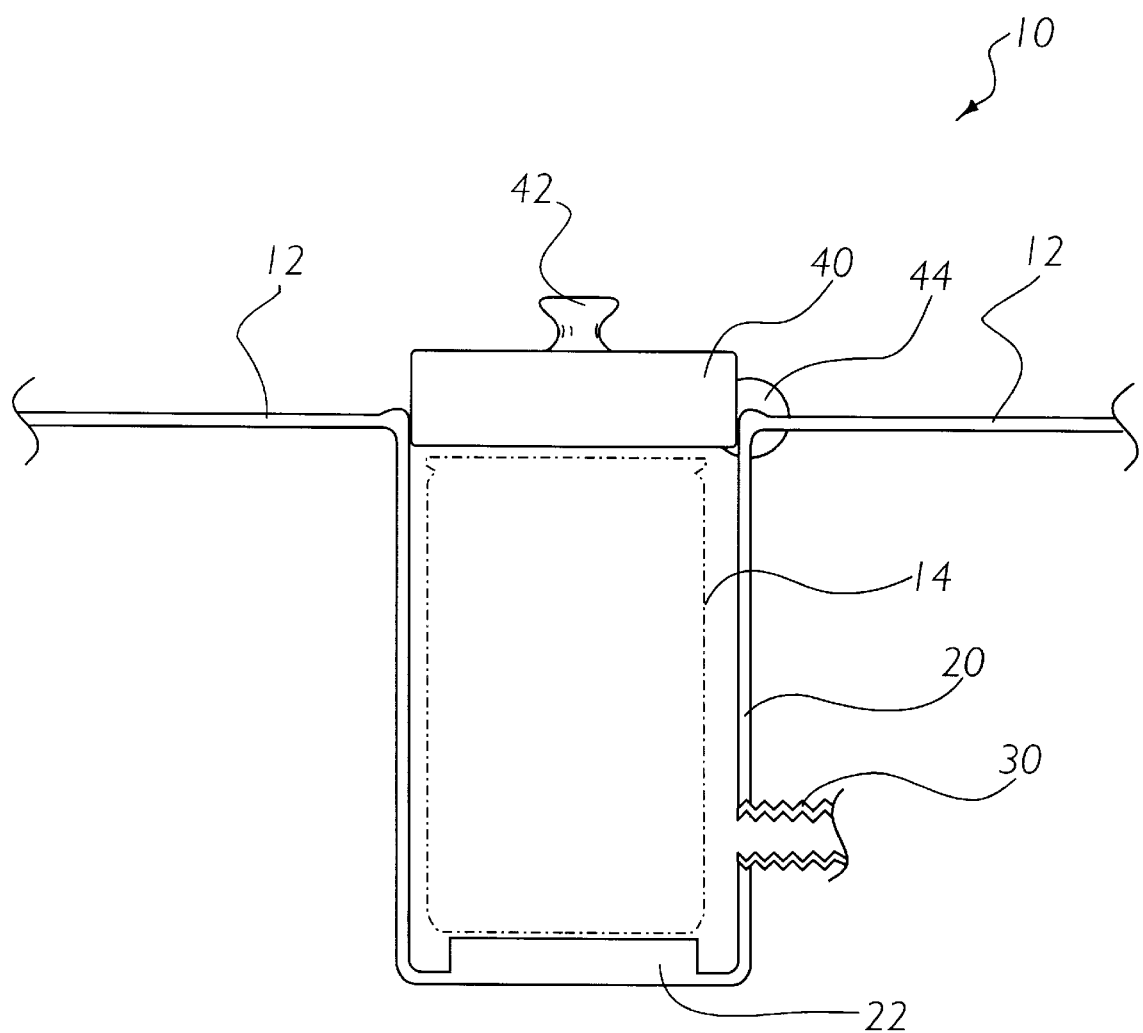
FIG. 1 is a cut-away side view of the present invention.

Turning now descriptively to the drawings, in which similar reference characters denote similar elements throughout the several view, FIGS. 1 through 5 illustrate a beverage temperature control system for a vehicle 10, which comprises a container 20 having a floor, at least one side wall and an upper opening, a plurality of support members 22 attached to the floor for supporting a beverage can 14 a finite distance above the floor, an air delivery tube 30 connected within the container 20 and fluidly connected to the vehicle's ventilation system, and a cover 40 pivotally attached to container 20 for allowing selective covering of the upper opening. The container 20 is preferably permanently positioned within the surface member 12 of a vehicle such as the side doors or dashboard. It can be appreciated that more than one of the present inventions may be positioned within the same vehicle, so the below description will only discuss only one of the units. The user opens the cover 40 and inserts the beverage can 14 or bottle into the interior of the container 20. The cool air from the ventilation system enters the interior of the container 20 about the beverage can 14 thereby cooling and maintaining the desired temperature of the beverage can 14. In an alternative embodiment, the container 20 does not have an upper opening, but rather a front side opening with a door 50 pivotally attached about for allowing a beverage can 14 to be inserted into the container 20 from the side.

As best shown in FIG. 1 of the drawings, the container 20 is positioned within the surface member 12 of a vehicle such as a dash or the interior side of a door. The upper portion of the container 20 is preferably substantially flush with the surface member 12 as further shown in Figure one of the drawings.

Figure 2:
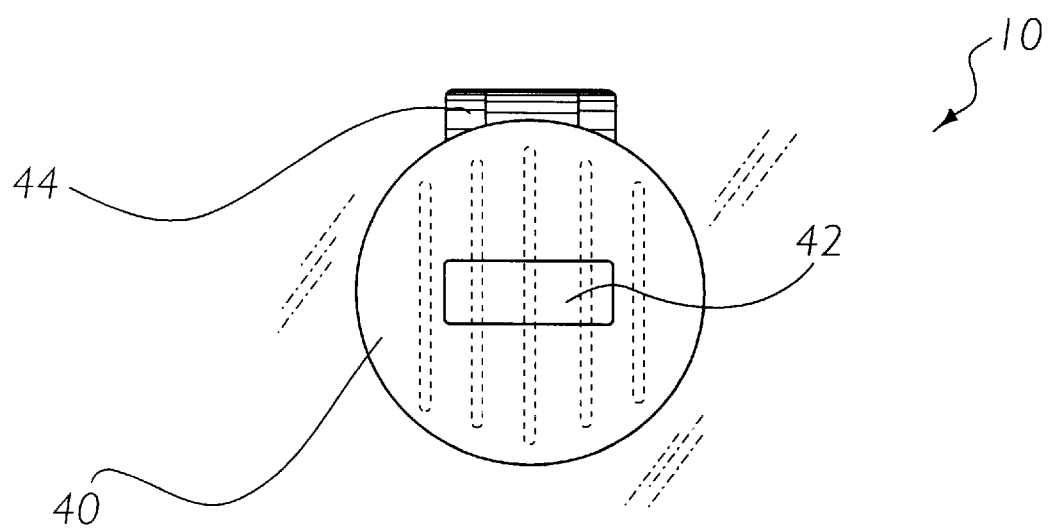
FIG. 2 is a top view of the present invention with the cover closed.
Figure 3:
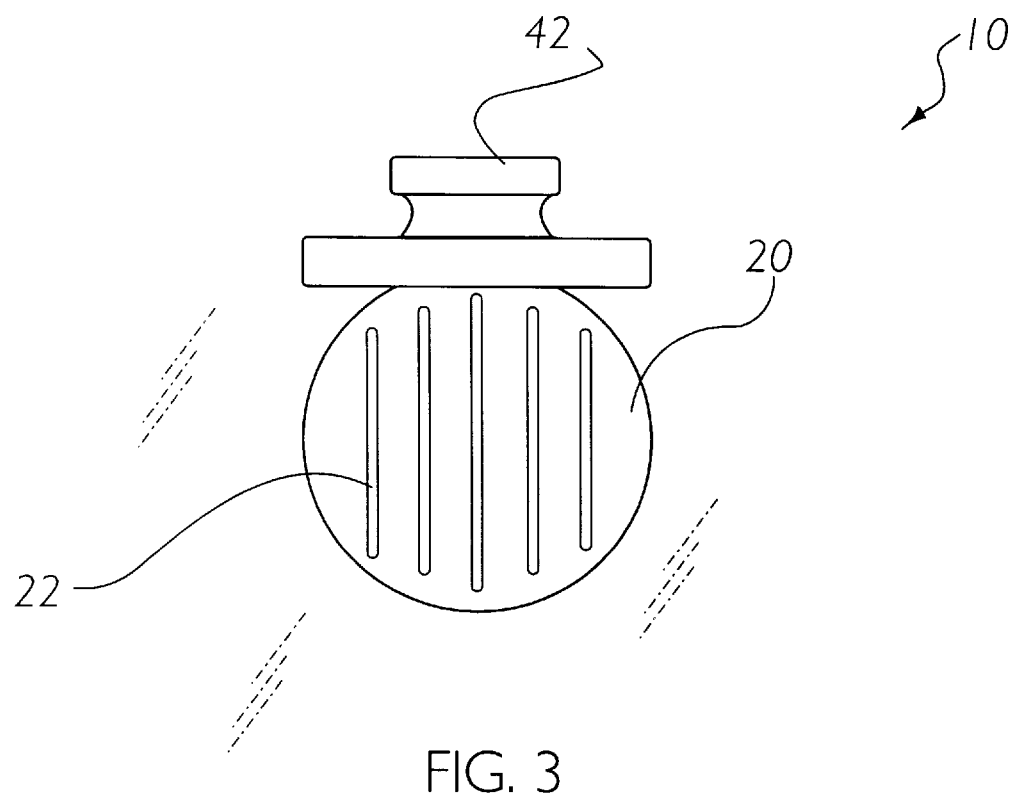
FIG. 3 is a top view of the present invention with the cover open showing the plurality of support members on the floor of the container.

The container 20 has a floor, at least one wall, and an upper opening as shown in FIGS. 1 through 3 of the drawings. The container 20 preferably has a circular cross-sectional area as best shown in FIGS. 2 and 3 of the drawings, however various other shapes may be utilized. The interior cavity of the container 20 is large enough to receive a conventional beverage can 14 commonly utilized with soft drinks. The container 20 is constructed of any well-known material such as metal or plastic.

As shown in FIGS. 1 through 3 of the drawings, a plurality of support members 22 extend from the floor of the container 20. The support members 22 support the bottom surface of the beverage can 14 above the floor of the container 20 for allowing cool air to surround the bottom surface and sides of the beverage can 14. The support members 22 are preferably parallel to one another as shown in FIGS. 2 and 3 of the drawings, however various other designs and shapes may be utilized for supporting the beverage can 14.

An air delivery tube 30 extends into the interior portion of the container 20 as shown in FIG. 1 of the drawings. The delivery tube 30 is fluidly connected to the ventilation system of the vehicle thereby providing cool air to the container 20 when the air-conditioner is active and providing warm air to the container 20 when the heater is active. The user adjusts the temperature within the container 20 by the vehicle's environmental controls and the fan adjustments.

As shown in FIGS. 1 through 3 of the drawings, a cover 40 is pivotally attached to the upper opening of the container 20 by a hinge 44. The cover 40 includes a handle 42 for allowing the user to easily grasp and manipulate. A plurality of vent apertures or slots may be utilized within the cover 40 for allowing the cover 40 to be closed with the beverage can 14 within thereby allowing the air from the ventilation system to pass through.

Figure 4:
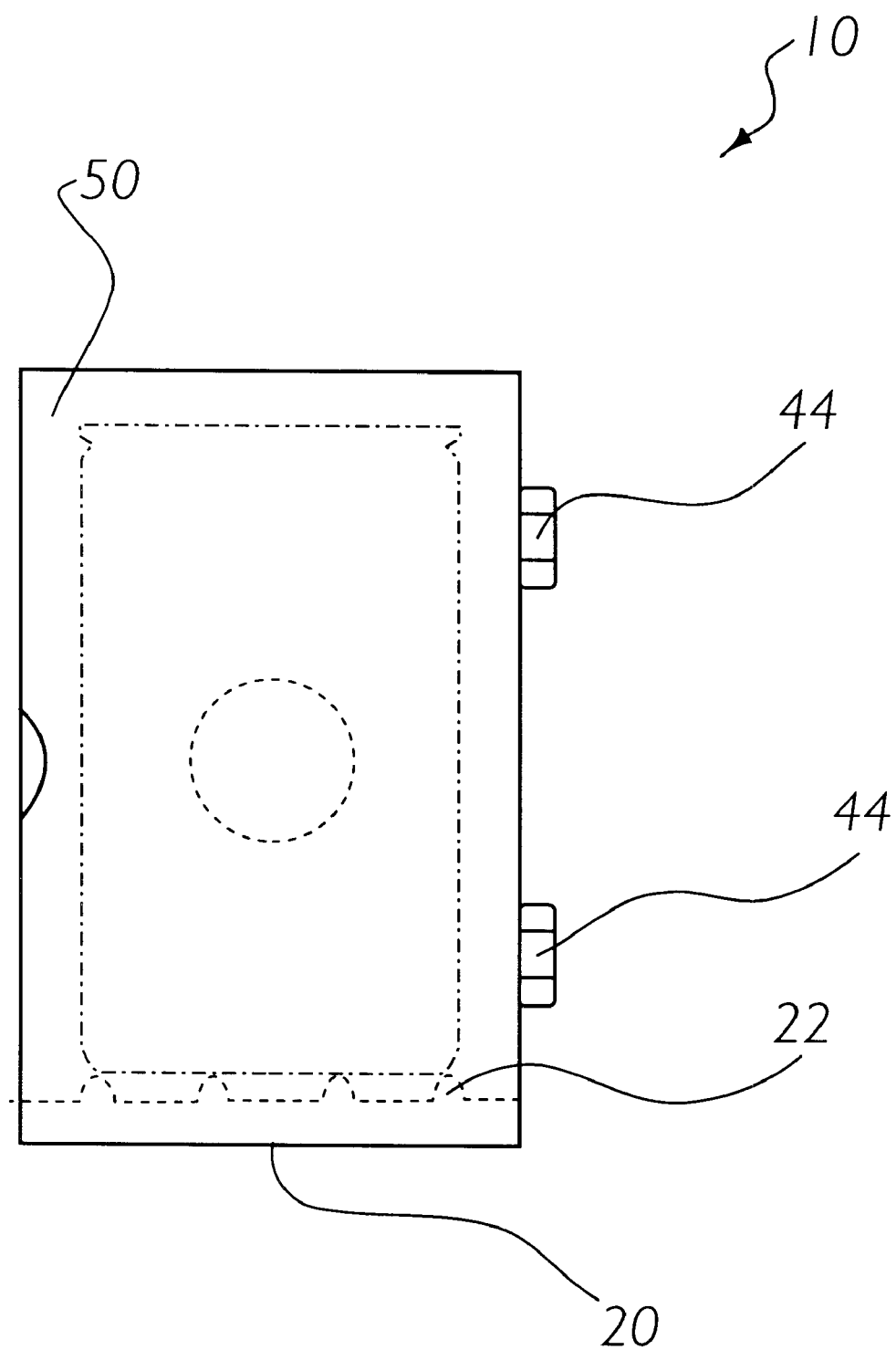
FIG. 4 is a front view of an alternative embodiment with the door closed.
Figure 5:
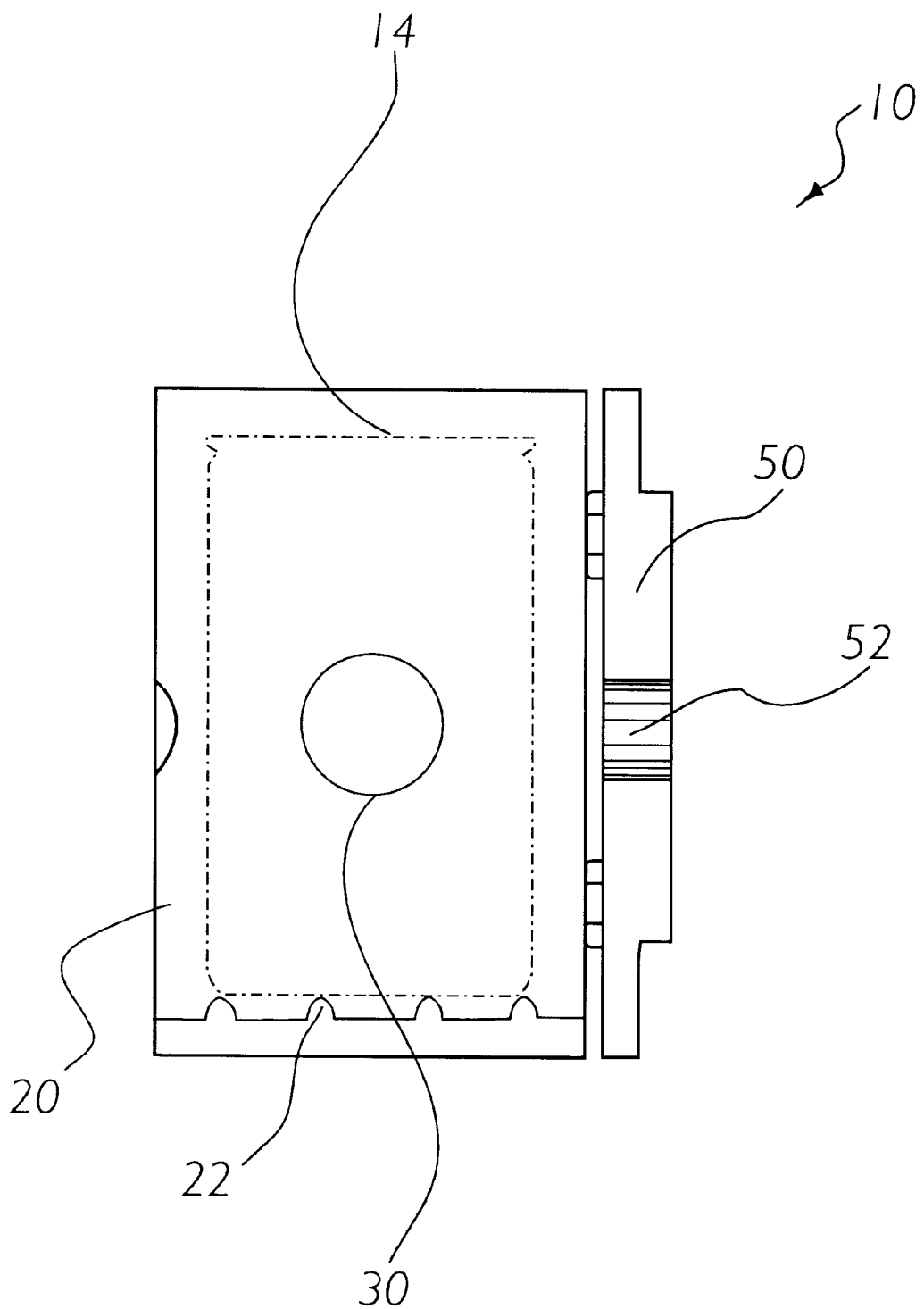
FIG. 5 is a front view of the alternative embodiment with the door opened showing the plurality of support members on the floor of the container.

In FIGS. 4 and 5 of the drawings, an alternative embodiment is provided having substantially the same elements as the main embodiment except for the upper opening, hence the description above is incorporated by reference into the alternative embodiment. As shown in FIG. 5 of the drawings, the container 20 includes a side opening for receiving the beverage can 14. As shown in FIGS. 4 and 5 of the drawings, a door 50 is pivotally attached to the side opening of the container 20 for allowing selective closing of the container 20. A latch 52 is preferably within the door 50 for retaining the door 50 in a closed position and for preventing the beverage can 14 from accidentally falling from within the container 20. The door 50 may also include a plurality of apertures or slots as with the cover 40 for allowing air to pass through.

In use, the user positions the beverage can 14 with the beverage within the upper opening of the container 20. The user then may leave the cover 40 open or the user may close the cover 40. The user then activates the vehicle ventilation system to the appropriate temperature setting and fan speed for achieving the desired temperature within the container 20. The cooled or heated air enters the container 20 through the delivery tube 30 and passes underneath and about the sides of the beverage can 14 thereby cooling or heating the contents within the beverage can 14. The user may then consume the beverage when desired by simply opening the cover 40 and removing the beverage can 14 from within. The cool or heated air is also allowed to enter the interior of the vehicle thereby simultaneously cooling or heating the interior of the vehicle as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Beverage Temperature Control System for a Vehicle

| | ENVIRONMENTAL ELEMENTS | 40. | Cover |
|---|---|---|---|
| | | 41. | |
| | | 42. | Handle |
| | | 43. | |
| | | 44. | Hinge |
| | | 45. | |
| | | 46. | |
| | | 47. | |
| | | 48. | |
| | | 49. | |
| 10. | Beverage Temperature Control System for a Vehicle | 50. | Door |
| | | 51. | |
| 11. | | 52. | Latch |
| 12. | Surface Member | 53. | |
| 13. | | 54. | |
| 14. | Beverage Can | 55. | |
| 15. | | 56. | |
| 16. | | 57. | |
| 17. | | 58. | |
| 18. | | 59. | |
| 19. | | 60. | |
| 20. | Container | 61. | |
| 21. | | 62. | |
| 22. | Support Members | 63. | |
| 23. | | 64. | |
| 24. | | 65. | |
| 25. | | 66. | |

-continued

Index of Elements for Beverage Temperature Control System for a Vehicle

| 26. | | 67. |
|---|---|---|
| 27. | | 68. |
| 28. | | 69. |
| 29. | | 70. |
| 30. | Delivery Tube | 71. |
| 31. | | 72. |
| 32. | | 73. |
| 33. | | 74. |
| 34. | | 75. |
| 35. | | 76. |
| 36. | | 77. |
| 37. | | 78. |
| 38. | | 79. |
| 39. | | |

I claim:

1. A beverage temperature control system for a vehicle, comprising:

a container having a floor, at least one wall and an upper opening for receiving a single beverage container, wherein said container is positionable within an interior structure of a vehicle;

a plurality of elongated support members extending upwardly from said floor for supporting and elevating said beverage container a finite distance above said floor for allowing air to pass beneath said beverage container thereby increasing the cooling of said beverage container; and a delivery tube fluidly connected between said container and a ventilation system of said vehicle for delivering cooled or heated air to said container, wherein said cooled or heated air enters said container in an air path having a longitudinal axis.

2. The beverage temperature control system for a vehicle of claim 1, wherein said plurality of raised support members are straight rigid members that are aligned parallel to one another, and wherein said plurality of raised support members each have a longitudinal axis parallel to said longitudinal axis of said air path.

3. The beverage temperature control system for a vehicle of claim 1, including a cover for enclosing said upper opening of said container.

4. The beverage temperature control system for a vehicle of claim 1, wherein said cover is pivotally attached to said container.

5. The beverage temperature control system for a vehicle of claim 1, wherein said cover includes a handle.

6. The beverage temperature control system for a vehicle of claim 1, wherein said cover includes a latch mechanism for retaining said cover in a closed position about said container.

7. The beverage temperature control system for a vehicle of claim 1, wherein said container has a cylindrical shape.

8. The beverage temperature control system for a vehicle of claim 1, wherein said cover includes at least one aperture for facilitating the exhaust of air from within said container.

9. The beverage temperature control system for a vehicle of claim 1, wherein said container is positionable substantially flush within said interior structure of said vehicle.

10. The beverage temperature control system for a vehicle of claim 1, wherein said container has a height greater than a height of said beverage container.

11. A beverage temperature control system for a vehicle, comprising:

a container having a floor, at least one wall and a side opening for receiving a single beverage container, wherein said container is positionable within an interior structure of a vehicle;

a plurality of elongated support members extending upwardly from said floor for supporting and elevating said beverage container a finite distance above said floor for allowing air to pass beneath said beverage container thereby increasing the cooling of said beverage container; and a delivery tube fluidly connected between said container and a ventilation system of said vehicle for delivering cooled or heated air to said container, wherein said cooled or heated air enters said container in an air path having a longitudinal axis.

12. The beverage temperature control system for a vehicle of claim 11, wherein said plurality of raised support members are straight rigid members that are aligned parallel to one another, and wherein said plurality of raised support members each have a longitudinal axis parallel to said longitudinal axis of said air path.

13. The beverage temperature control system for a vehicle of claim 11, including a cover for enclosing said side opening of said container.

14. The beverage temperature control system for a vehicle of claim 11, wherein said cover is pivotally attached to said container.

15. The beverage temperature control system for a vehicle of claim 11, wherein said cover includes a handle.

16. The beverage temperature control system for a vehicle of claim 11, wherein said cover includes a latch mechanism for retaining said cover in a closed position about said container.

17. The beverage temperature control system for a vehicle of claim 11, wherein said container has a cylindrical shape.

18. The beverage temperature control system for a vehicle of claim 11, wherein said cover includes at least one aperture.

19. The beverage temperature control system for a vehicle of claim 11, wherein said container is positionable substantially flush within said interior structure of said vehicle.

20. The beverage temperature control system for a vehicle of claim 11, wherein said container has a height greater than a height of said beverage container.

* * * * *